US012600384B2

(12) United States Patent
Sadek et al.

(10) Patent No.: US 12,600,384 B2
(45) Date of Patent: Apr. 14, 2026

(54) MODEL HYPERPARAMETER ADJUSTMENT USING VEHICLE DRIVING CONTEXT CLASSIFICATION

(71) Applicant: QUALCOMM Incorporated, San Diego, CA (US)

(72) Inventors: Ahmed Kamel Sadek, San Diego, CA (US); Pranav Desai, San Diego, CA (US); Stephen Marc Chaves, Philadelphia, PA (US); Paul Daniel Martin, Devon, PA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 17/655,837

(22) Filed: Mar. 22, 2022

(65) Prior Publication Data

US 2023/0303123 A1 Sep. 28, 2023

(51) Int. Cl.
*B60W 60/00* (2020.01)
*B60W 50/00* (2006.01)
*G05B 13/02* (2006.01)

(52) U.S. Cl.
CPC .... *B60W 60/0027* (2020.02); *B60W 50/0097* (2013.01); *G05B 13/027* (2013.01); *B60W 2050/0028* (2013.01); *B60W 2420/403* (2013.01); *B60W 2552/05* (2020.02)

(58) Field of Classification Search
None
See application file for complete search history.

(56) References Cited

U.S. PATENT DOCUMENTS

| | | | | |
|---|---|---|---|---|
| 10,671,076 B1* | 6/2020 | Kobilarov | .............. | G08G 1/166 |
| 2018/0089563 A1* | 3/2018 | Redding | ................ | G06N 3/006 |
| 2019/0101919 A1* | 4/2019 | Kobilarov | .............. | G05D 1/617 |
| 2020/0363800 A1 | 11/2020 | Jojo-Verge et al. | | |

(Continued)

FOREIGN PATENT DOCUMENTS

| | | |
|---|---|---|
| EP | 3751465 A1 | 12/2020 |
| KR | 102029852 B1 | 10/2019 |
| WO | 2022017307 A1 | 1/2022 |

OTHER PUBLICATIONS

Chen J., et al., "Driving Maneuvers Prediction Based Autonomous Driving Control by Deep Monte Carlo Tree Search", IEEE Transactions on Vehicular Technology, IEEE, USA, vol. 69, No. 7, Apr. 30, 2020, 13 Pages, XP011798493, Sections IV, VI.

(Continued)

*Primary Examiner* — Anne Marie Antonucci
*Assistant Examiner* — Kyle S Park
(74) *Attorney, Agent, or Firm* — Harrity & Harrity, LLP

(57) ABSTRACT

In some aspects, a device of a vehicle may obtain information relating to an environment in which the vehicle is located. The device may determine using a machine learning model, a driving context of the vehicle based at least in part on the information relating to the environment, and a set of hyperparameters for a model, that is used to determine a driving behavior for the vehicle, based at least in part on the driving context. The device may determine, using the model configured with the set of hyperparameters, the driving behavior for the vehicle. The device may cause autonomous operation of the vehicle in accordance with the driving behavior. Numerous other aspects are described.

30 Claims, 6 Drawing Sheets

(56) References Cited

U.S. PATENT DOCUMENTS

| | | | |
|---|---|---|---|
| 2020/0401892 A1 | 12/2020 | Redding et al. | |
| 2021/0188306 A1 | 6/2021 | Himayat et al. | |
| 2021/0213959 A1* | 7/2021 | Shahriari | G05D 1/0088 |
| 2021/0347379 A1 | 11/2021 | Je et al. | |
| 2021/0370980 A1* | 12/2021 | Ramamoorthy | B60W 60/0015 |
| 2021/0380128 A1 | 12/2021 | Narang et al. | |
| 2022/0250646 A1* | 8/2022 | Kobilarov | B60W 50/0097 |
| 2023/0041975 A1* | 2/2023 | Caldwell | G05B 13/0265 |
| 2023/0073326 A1* | 3/2023 | Schrittwieser | G06F 18/214 |
| 2023/0182014 A1* | 6/2023 | Dai | A63F 13/47 |
| | | | 463/6 |

OTHER PUBLICATIONS

International Search Report and Written Opinion—PCT/US2023/061261—ISA/EPO—Apr. 17, 2023.
Marina L.A., et al., "Deep Grid Net (DGN): A Deep Learning System for Real-Time Driving Context Understanding", 2019 Third IEEE International Conference on Robotic Computing (IRC), IEEE, Feb. 25, 2019, pp. 399-402, XP033532622, figure 1.

* cited by examiner

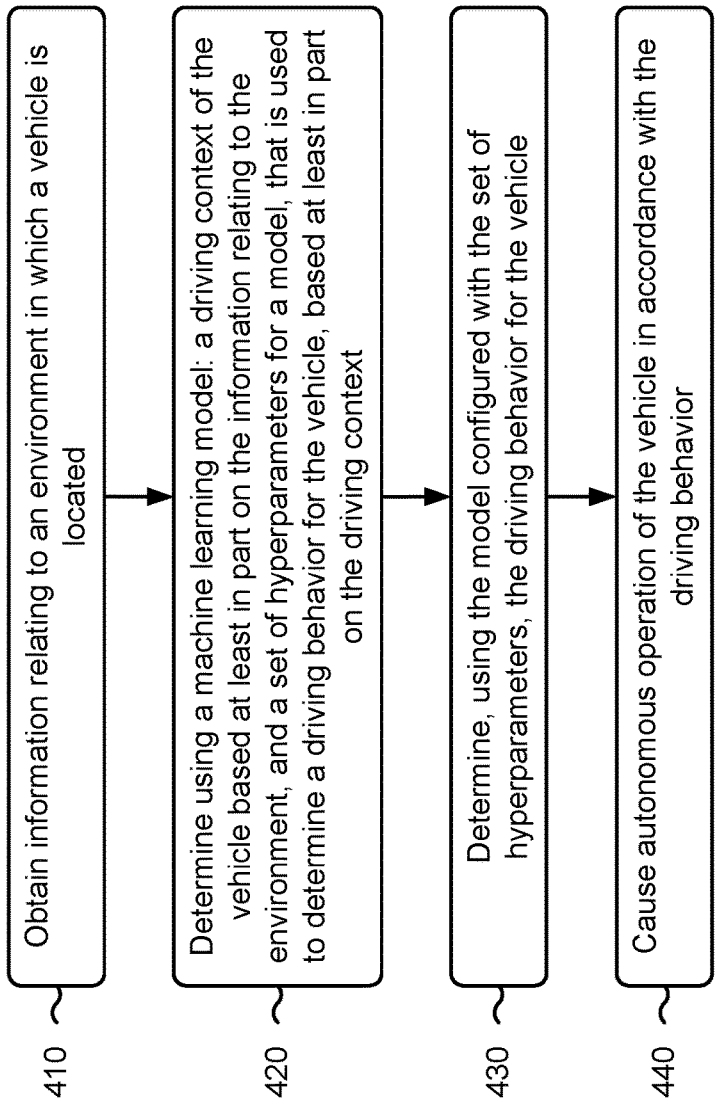

410 Obtain information relating to an environment in which a vehicle is located

420 Determine using a machine learning model: a driving context of the vehicle based at least in part on the information relating to the environment, and a set of hyperparameters for a model, that is used to determine a driving behavior for the vehicle, based at least in part on the driving context 430 Determine, using the model configured with the set of hyperparameters, the driving behavior for the vehicle 440 Cause autonomous operation of the vehicle in accordance with the driving behavior

MODEL HYPERPARAMETER ADJUSTMENT USING VEHICLE DRIVING CONTEXT CLASSIFICATION

FIELD OF THE DISCLOSURE

Aspects of the present disclosure generally relate to wireless communication and to techniques and apparatuses for model hyperparameter adjustment using vehicle driving context classification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method. The method may include obtaining, by a device of a vehicle, information relating to an environment in which the vehicle is located. The method may include determining, by the device using a machine learning model, a driving context of the vehicle based at least in part on the information relating to the environment, and a set of hyperparameters for a model, that is used to determine a driving behavior for the vehicle, based at least in part on the driving context. The method may include determining, by the device and using the model configured with the set of hyperparameters, the driving behavior for the vehicle. The method may include causing, by the device, autonomous operation of the vehicle in accordance with the driving behavior.

Some aspects described herein relate to a system for autonomous driving of a vehicle. The system may include a memory and one or more processors coupled to the memory. The one or more processors may be configured to obtain information relating to an environment in which the vehicle is located. The one or more processors may be configured to determine, using a machine learning model, a driving context of the vehicle based at least in part on the information relating to the environment, and a set of hyperparameters for a model, that is used to determine a driving behavior for the vehicle, based at least in part on the driving context. The one or more processors may be configured to determine, using the model configured with the set of hyperparameters, the driving behavior for the vehicle. The one or more processors may be configured to cause autonomous operation of the vehicle in accordance with the driving behavior.

Some aspects described herein relate to a non-transitory computer-readable medium that stores a set of instructions by a device. The set of instructions, when executed by one or more processors of the device, may cause the device to obtain information relating to an environment in which a vehicle is located. The set of instructions, when executed by one or more processors of the device, may cause the device to determine, using a machine learning model, a driving context of the vehicle based at least in part on the information relating to the environment, and a set of hyperparameters for a model, that is used to determine a driving behavior for the vehicle, based at least in part on the driving context. The set of instructions, when executed by one or more processors of the device, may cause the device to configure the model with the set of hyperparameters based at least in part on determining the set of hyperparameters.

Some aspects described herein relate to an apparatus. The apparatus may include means for obtaining information relating to an environment in which a vehicle is located. The apparatus may include means for determining, using a machine learning model, a set of hyperparameters for a model, that is used to determine a driving behavior for the vehicle, based at least in part on the information relating to the environment. The apparatus may include means for configuring the model with the set of hyperparameters based at least in part on determining the set of hyperparameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process associated with model hyperparameter adjustment using vehicle driving context classification, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
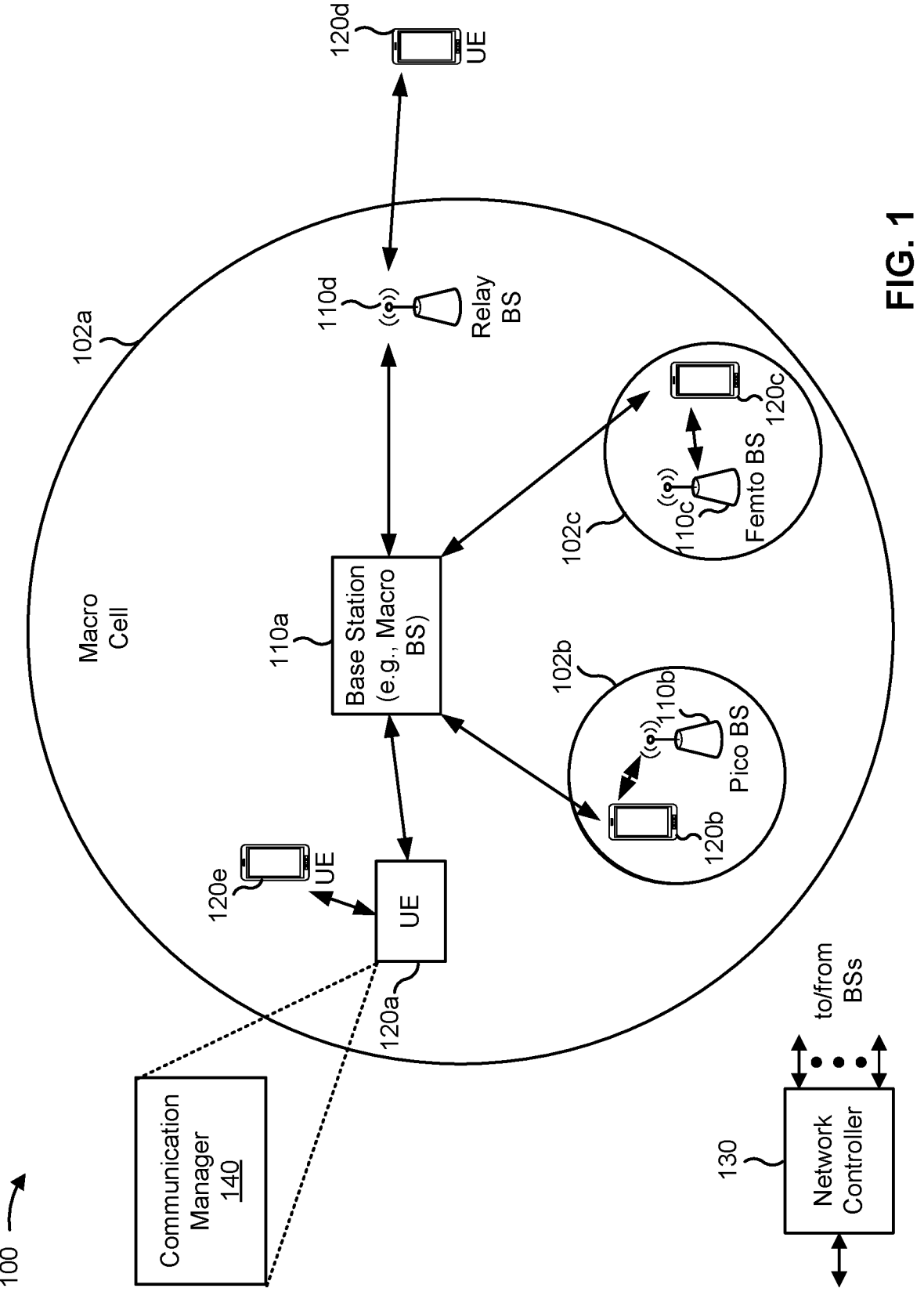
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain information relating to an environment in which a vehicle is located; determine using a machine learning model: a driving context of the vehicle based at least in part on the information relating to the environment, and a set of hyperparameters for a model, that is used to determine a driving behavior for the vehicle, based at least in part on the driving context; determine, using the model configured with the set of hyperparameters, the driving behavior for the vehicle; and cause autonomous operation of the vehicle in accordance with the driving behavior. Additionally, or alternatively, the communication manager 140 may perform one or more other operations described herein.

As indicated above, FIG. 1 is provided as an example. Other examples may differ from what is described with regard to FIG. 1.

Figure 2:
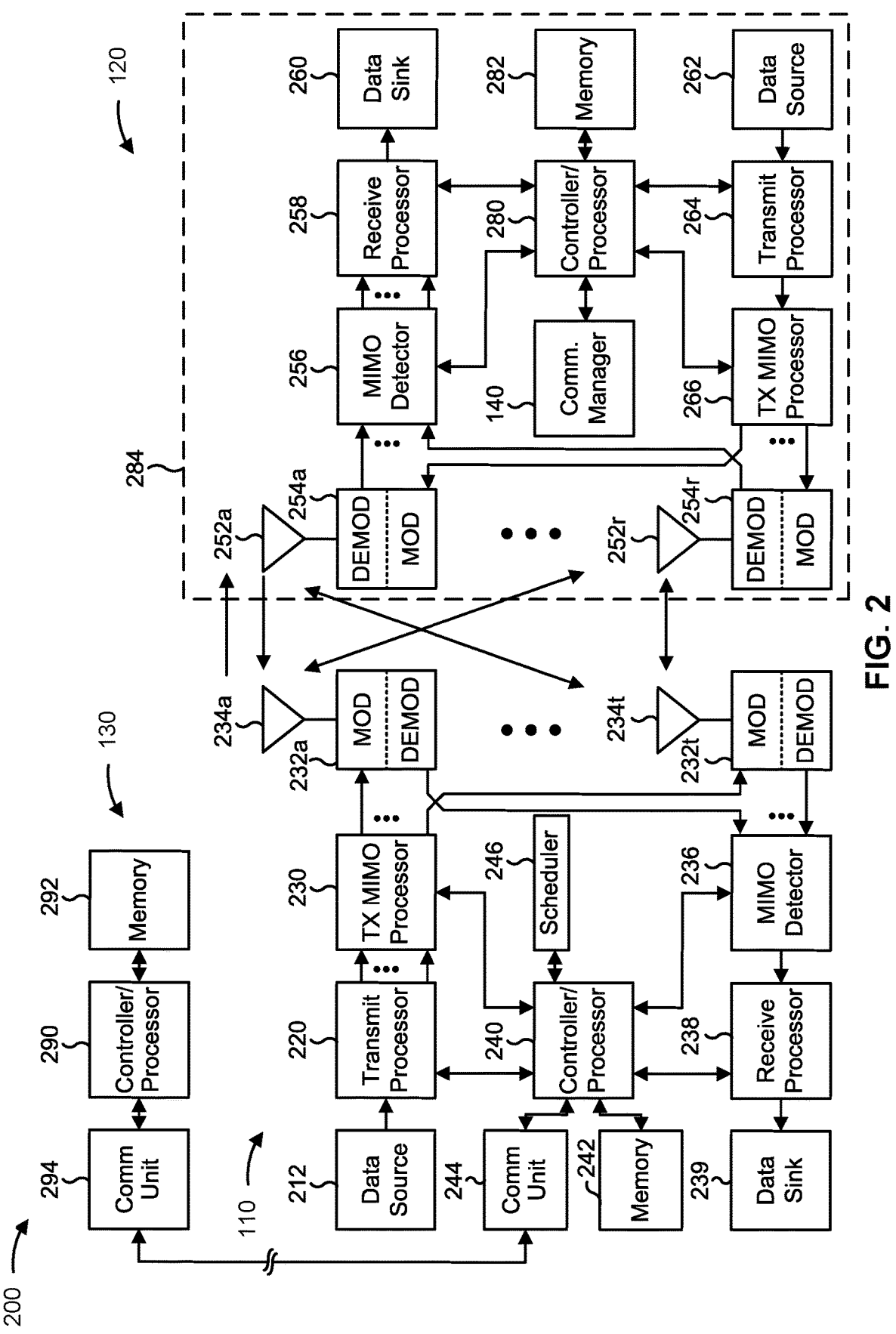
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-3B, 4, and 5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-3B, 4, and 5).

The controller/processor 240 of the base station 110, the controller/processor 280 of the UE 120, and/or any other component(s) of FIG. 2 may perform one or more techniques associated with model hyperparameter adjustment using vehicle driving context classification, as described in more detail elsewhere herein. In some aspects, a system for autonomous driving is the UE 120, is included in the UE 120, or includes one or more components of the UE 120 shown in FIG. 2. The controller/processor 240 of the base station 110, the controller/processor 280 of the UE 120, and/or any other component(s) of FIG. 2 may perform or direct operations of, for example, process 400 of FIG. 4, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some examples, executing instructions may include running the instructions, converting the instructions, compiling the instructions, and/or interpreting the instructions, among other examples.

In some aspects, a system for autonomous driving includes means for obtaining, by a device of a vehicle, information relating to an environment in which the vehicle is located; means for determining by the device using a machine learning model: a driving context of the vehicle based at least in part on the information relating to the environment, and a set of hyperparameters for a model, that is used to determine a driving behavior for the vehicle, based at least in part on the driving context; means for determining, by the device and using the model configured with the set of hyperparameters, the driving behavior for the vehicle; and/or means for causing, by the device, autonomous operation of the vehicle in accordance with the driving behavior. In some aspects, the means for the device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

An autonomous driving system (e.g., an advanced driver-assistance system (ADAS)) for a vehicle may perform three primary operations: sensing, planning (e.g., what a vehicle is to do), and acting. The planning operation (e.g., behavioral planning) may include drive policy for the vehicle. One challenge for autonomous driving systems is generalizing behaviors for different contexts. For example, the parameters for drive policy in a free-flowing highway context may be different from the parameters for drive policy at an intersection in a dense urban context. Using independent drive policies for different driving contexts (e.g., highway, parking lot, or intersection) lacks scalability and consumes excessive computing resources.

An autonomous driving system for a vehicle may use a model based on a scalable global planner algorithm, such as a Monte Carlo tree search (MCTS) algorithm or another searching algorithm, to determine drive policy for the vehicle that maximizes a reward function. The model may be initialized with a set of hyperparameters (e.g., tree width, tree depth, time step resolution, or the like, in the case of MCTS) that are static over the usage of the model in various driving contexts. Thus, the model may be unable to adapt to different driving contexts and may produce sub-optimal autonomous operation of the vehicle. Moreover, as described above, the use of multiple models with different sets of hyperparameters for each driving context lacks scalability to new driving contexts and consumes excessive computing resources in connection with storing, switching between, and updating the multiple models.

Some techniques and apparatuses described herein provide an autonomous driving system in which the hyperparameters for a model (e.g., an MCTS model), that determines driving behavior for a vehicle, may be adjusted based on a driving context classification of the vehicle (e.g., a highway classification, a parking lot classification, an intersection classification, or the like). In some aspects, the autonomous driving system may use a machine learning model, such as a neural network, to determine a set of hyperparameters for the model based on the driving context classification of the vehicle. For example, if the vehicle is in a parking lot, the hyperparameters determined by the machine learning model for the model may influence the model to determine driving behavior quickly. As another example, if the vehicle is on a free-flowing highway, the hyperparameters determined by the machine learning model for the model may influence the model to determine driving behavior further into the future.

Inputs to the machine learning model may include information relating to an environmental model for the vehicle (e.g., a model of objects surrounding the vehicle that is based on the vehicle's sensor data) and/or intention predictions of the vehicle (e.g., predictions relating to the next movements of objects in the environment of the vehicle). In some aspects, the machine learning model may be trained to identify various driving contexts (e.g., highway, parking lot, intersection, or the like), and to determine a set of hyperparameters (e.g., tree width, tree depth, or the like) for the model based on the driving context. In some other aspects, the machine learning model may receive (e.g., from another machine learning model) information indicating a driving context of the vehicle as an input, and the machine learning model may be trained to determine a set of hyperparameters for the model based on the driving context. In some aspects, the machine learning model may be trained end-to-end with the model (e.g., the MCTS model) in the training loop.

In this way, the autonomous driving system may adjust the hyperparameters used by the model based at least in part on a driving context of the vehicle. Accordingly, the hyperparameters may be adjusted in real time or near-real time to adapt to a current driving context of the vehicle. Thus, the model for determining driving behavior is scalable across the various driving contexts that may be encountered by the vehicle, as well as extendable to new driving contexts. Accordingly, the autonomous driving system may use a single model to determine suitable driving behavior for the vehicle across various driving contexts, thereby conserving computing resources that may otherwise be expended storing, switching between, and updating multiple models.

Figure 3A:
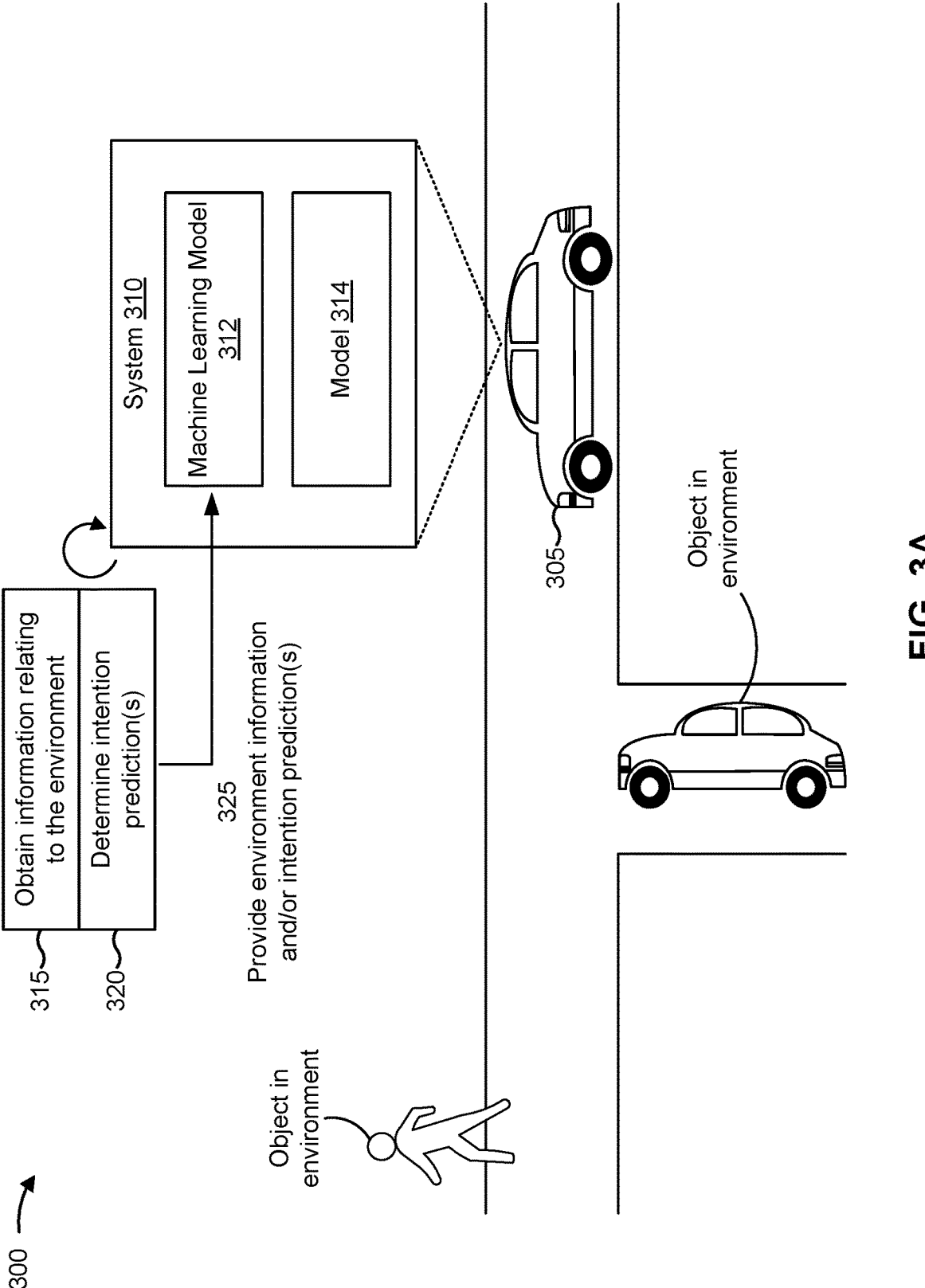
FIGS. 3A-3B are diagrams illustrating an example of model hyperparameter adjustment using vehicle driving context classification, in accordance with the present disclosure.
Figure 3B:
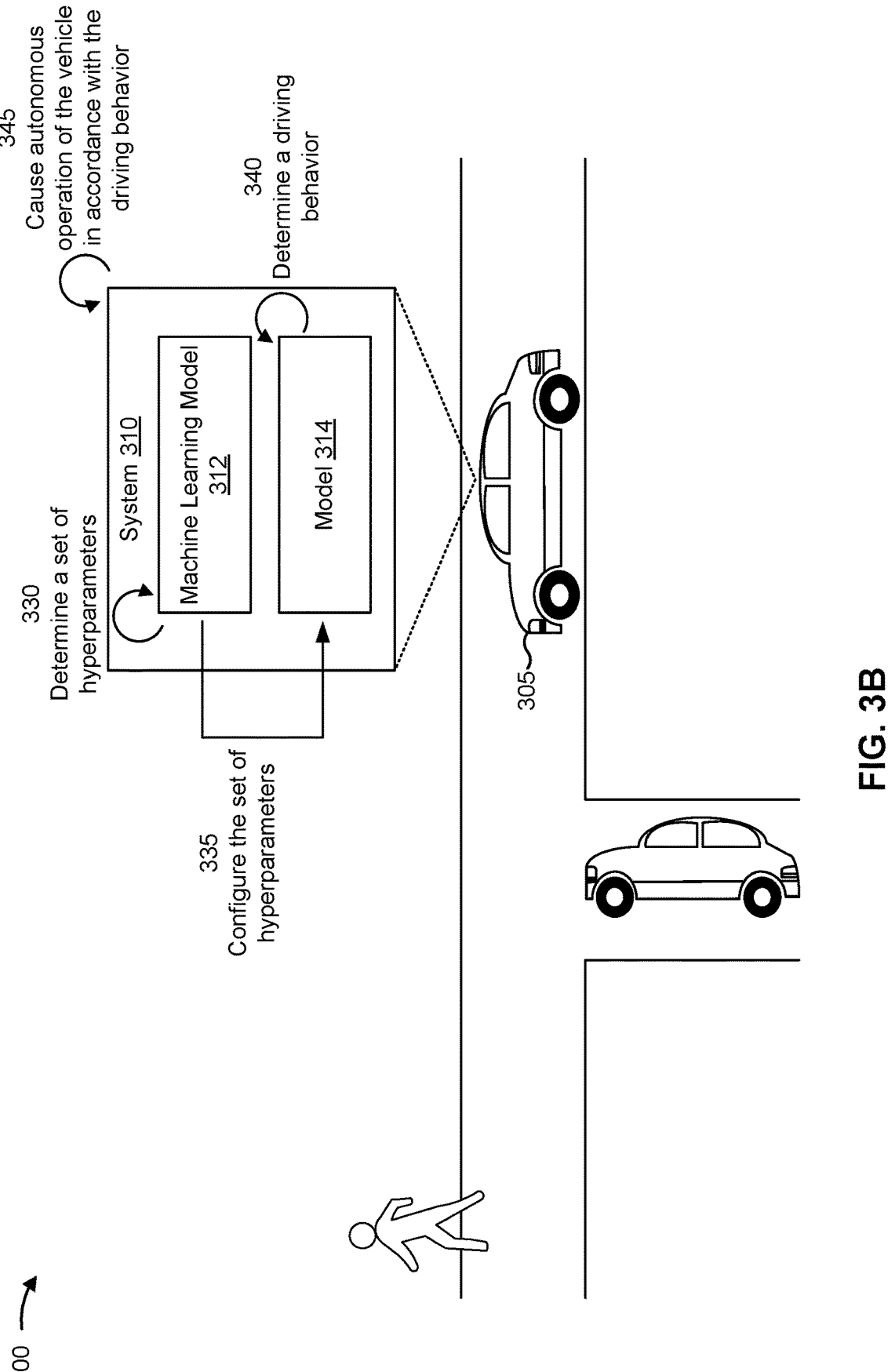

FIGS. 3A-3B are diagrams illustrating an example 300 of model hyperparameter adjustment using vehicle driving context classification, in accordance with the present disclosure. As shown, example 300 may include a vehicle 305 that includes a system 310 for autonomous driving. The vehicle 305 may be a car, a bus, a truck, a work machine (e.g., a tractor, a bulldozer, or the like), or the like. The system 310 may include one or more computing devices. In some aspects, the system 310 may be, or may include, a UE 120.

The system 310 may implement a machine learning model 312 that is trained to determine a set of hyperparameters for a model 314 used to determine a driving behavior for the vehicle 305. For example, the machine learning model 312 may be trained to determine the set of hyperparameters based at least in part on a driving context of the vehicle 305, as described herein. In particular, the machine learning model 312 may be trained to determine the set of hyperparameters based at least in part on an input of environmental information (e.g., camera data, light detection and ranging (LIDAR) data, or the like) associated with the vehicle 305. In some aspects, the machine learning model 312 may be a neural network (e.g., a feedforward neural network, a convolutional neural network, or the like).

In some aspects, the system 310 may train the machine learning model 312. The system 310 may train the machine learning model 312 alone, or in cooperation with similar systems of one or more other vehicles (e.g., using distributed learning, federated learning, or the like). In some other aspects, the system 310 may receive the trained machine learning model 312 from another device or may otherwise be provisioned with the trained machine learning model 312. In some aspects, the machine learning model 312 may be trained using a reinforcement learning technique. The training data for the machine learning model 312 may include environmental information for a vehicle, such as camera data, LIDAR data, or the like. Moreover, the machine learning model 312 may be trained based at least in part on an output of the model 314 (e.g., a loss function for training the machine learning model 312 may be based at least in part on an output of the model 314).

In practice, the vehicle 305 may be located in an environment that includes one or more objects. For example, the objects may include one or more other vehicles and/or one or more pedestrians, among other examples. As shown in FIG. 3A, and by reference number 315, the system 310 may obtain information relating to the environment (e.g., obtain an environmental model) in which the vehicle 305 is located (referred to herein as "environment information"). For example, the system 310 may obtain the environment information from one or more sensors of the vehicle 305. The one or more sensors may include one or more LIDAR systems of the vehicle 305, one or more cameras of the vehicle 305, and/or one or more radio detection and ranging (RADAR) systems of the vehicle 305, among other examples. In some aspects, the environment information may include location data associated with the vehicle 305, map data associated with the location of the vehicle 305, traffic data associated with the vehicle 305, condition data (e.g., weather data, car accident data, lane closure data, or the like) associated with the location of the vehicle 305, or the like. The system 310 may obtain the location data from a sensor of the vehicle 305 (e.g., a global navigation satellite system (GNSS) of the vehicle 305, such as a global positioning system (GPS) of the vehicle 305). The system 310 may obtain the map data, the traffic data, and/or the condition data from a storage system of the vehicle 305, from another vehicle (e.g., using V2X communication on a sidelink), from a server device (e.g., via communication using wireless network 100), or the like.

As shown by reference number 320, the system 310 may determine one or more intention predictions. The one or more intention predictions may relate to one or more objects (e.g., other vehicles, pedestrians, animals, or the like) in the environment of the vehicle 305. The system 310 may identify the one or more objects from the environment information (e.g., using a computer vision technique, an object detection technique, or the like). The system 310 may determine the one or more intention predictions using a different machine learning model. An intention prediction for an object may be a prediction of a future movement (e.g., movement direction, movement speed, or the like) of the object.

As shown by reference number 325, the system 310 may provide (e.g., as an input) the environment information and/or the one or more intention predictions to the machine learning model 312. As shown, the system 310 may implement the machine learning model 312. However, in some aspects, the machine learning model 312 may be implemented by a remote device from the system 310 (e.g., by a remote server device, by a cloud computing environment, by a roadside unit, or the like). Here, to provide the environment information and/or the intention prediction(s) to the machine learning model 312, the system 310 may transmit the environment information and/or the intention prediction(s) to the remote device (e.g., via wireless network 100).

As shown in FIG. 3B, and by reference number 330, the system 310 may determine a set of hyperparameters for the model 314. The system 310 may determine the set of hyperparameters for the model 314 based at least in part on the environment information and/or the intention prediction(s). In particular, the system 310 may determine the set of hyperparameters for the model 314 based at least in part on a driving context of the vehicle that is indicated by the environment information and/or the intention prediction(s). Thus, the system 310 may determine a first set of hyperparameters for the model 314 responsive to a first driving context, the system 310 may determine a second set of hyperparameters for the model 314 responsive to a second driving context, and so forth. For example, for a highway driving context, the system 310 may determine a relatively greater tree depth for the model 314, and for a parking lot context, the system 310 may determine a relatively lesser tree depth for the model 314.

In some aspects, the system 310 may determine the set of hyperparameters for the model 314 continuously (e.g., at a same frequency at which the model 314 determines driving behavior). In some aspects, the system 310 may determine the set of hyperparameters for the model 314 periodically (e.g., at a slower frequency than at which the model 314 determines driving behavior). In some aspects, the system 310 may determine the set of hyperparameters for the model 314 based at least in part on detecting the occurrence of an event. For example, the system 310 may determine the set of hyperparameters for the model 314 based at least in part on detecting (e.g., using a machine learning model trained to perform driving context classification, as described herein) that a driving context of the vehicle 305 has changed. In some aspects, the system 310 may store information indicating a route that is to be taken by the vehicle 305. Here, the system 310 may determine locations at which the driving context of the vehicle 305 will change based at least in part on the route, and the system 310 may determine the set of hyperparameters when the vehicle 305 is at, or is approaching, a location at which the driving context of the vehicle will change.

The system 310 may determine the set of hyperparameters for the model 314 using the machine learning model 312. For example, the system 310, using the machine learning model 312, may determine a driving context (e.g., a driving context classification) of the vehicle 305 based at least in part on the environment information and/or the intention prediction(s), and determine a set of hyperparameters for the model 314 based at least in part on the driving context. In other words, the machine learning model 312 may output the set of hyperparameters for the model 314 responsive to an input to the machine learning model 312 of the environment information and/or the intention prediction(s).

In some aspects, the machine learning model 312 may be trained to determine the set of hyperparameters based at least in part on a feature set relating to characteristics of the environment information and/or the intention prediction(s) (e.g., the feature set may include a quantity of objects in the environment, distances of objects in the environment from the vehicle 305, speeds of objects in the environment, orientations of objects in the environment relative to the vehicle 305, movements of objects in the environment relative to the vehicle 305, configurations of one or more roads in the environment, traffic signals in the environment, and/or traffic signs in the environment, among other examples). In some aspects, the machine learning model 312 may be trained to determine a driving context classification based at least in part on a feature set relating to characteristics of the environment information and/or the intention prediction(s), and the machine learning model 312 may be trained to determine the set of hyperparameters based at least in part on the driving context classification and/or the intention prediction(s). In some aspects, the system 310, using a different machine learning model, may determine the driving context classification based at least in part on the environment information and/or the intention prediction(s), and the machine learning model 312 may be trained to determine the set of hyperparameters based at least in part on the driving context classification and/or the intention prediction(s). In some aspects, the system 310 may determine the driving context classification, as described herein, and the system 310 may use a mapping (e.g., stored by the system 310) of driving context classifications to sets of hyperparameters in order to determine the set of hyperparameters. In some aspects, the system 310 may determine the driving context classification based at least in part on information indicating a route that is to be taken by the vehicle 305, as described herein.

A driving context may relate to a current driving scenario in which the vehicle 305 is involved. For example, a driving context may relate to a type of road on which the vehicle 305 is traveling, a type of intersection that the vehicle 305 is approaching, a driving maneuver that the vehicle 305 is performing, or the like. As an example, the driving context may be an intersection context, a traffic signal context, a highway context, a local road context, a one-way road context, a parking lot context, a parking context, a parallel parking context, or a merging context, among other examples. In some aspects, the set of hyperparameters determined by the system 310, based at least in part on the driving context, may include (e.g., for a heuristic search algorithm) a tree width, a tree depth, a time length for a step in a tree, a reward function, and/or a scope of an action space, among other examples.

In some aspects, the system 310 may determine the set of hyperparameters using cooperation between the vehicle 305 and one or more different vehicles. In particular, a vehicle arriving at a location or area associated with a particular driving context may determine hyperparameters based at least in part on the driving context, as described herein, and the vehicle may transmit information indicating the hyperparameters that are determined to one or more neighboring vehicles (e.g., particularly neighboring vehicles that are about to arrive at the location or the area). The information may also indicate a feedback value (e.g., a loss function value, a reward function value, or the like) that quantifies an accuracy and/or an optimality associated with a driving behavior that was determined by the vehicle based at least in part on the hyperparameters, as described herein. For example, the system 310 may receive (e.g., using V2X communication on a sidelink) information indicating hyperparameters determined at a different vehicle for a particular location or area and/or a feedback value. Continuing with the example, the system 310 may use the hyperparameters determined at the different vehicle, or the system 310 may determine (e.g., using the machine learning model 312) the set of hyperparameters based at least in part on the hyperparameters determined at the different vehicle and/or the feedback value. For example, the hyperparameters determined at the different vehicle and/or the feedback value may be additional inputs to the machine learning model 312. In this way, vehicles may cooperate to facilitate hyperparameter determination that improves over time.

As shown by reference number 335, the system 310 may configure the model 314 with the set of hyperparameters. That is, the system 310 may initialize the model 314 using the set of hyperparameters. In some aspects, the model 314 may be based at least in part on a heuristic search algorithm (e.g., a scalable global planner algorithm). For example, the model 314 may be based at least in part on an MCTS. That is, the model 314 may employ an MCTS algorithm.

As shown by reference number 340, the system 310 may determine a driving behavior (e.g., drive policy) for the vehicle 305. For example, the system 310 may determine the driving behavior for the vehicle 305 using the model 314 configured with the set of hyperparameters. As an example, the system 310 may determine the driving behavior by executing the MCTS algorithm with respect to the set of hyperparameters (e.g., by executing the MCTS algorithm using a particular tree width indicated by the set of hyperparameters, using a particular tree depth indicated by the set of hyperparameters, and so forth). The model 314 may be configured to output the driving behavior responsive to an input of input information, such as the environment information (e.g., an environmental model), the intention prediction(s), or the like. Moreover, the system 310 may determine the driving behavior, using the model 314, so as to maximize a reward function for the model 314. The driving behavior may relate to an action of the vehicle 305 (e.g., braking, accelerating, turning, or the like), a speed of the vehicle 305, and/or a path of the vehicle 305.

As shown by reference number 345, the system 310 may cause autonomous operation (e.g., operation without human input) of the vehicle 305 in accordance with the driving behavior. For example, the system 310 may cause one or more systems of the vehicle 305 (e.g., a steering system, a propulsion system, a braking system, or the like) to perform one or more operations in accordance with the driving behavior.

In this way, the model 314 may determine suitable driving behavior for different driving contexts. In particular, the model 314 may be adapted to different driving contexts by adjusting, using the machine learning model 312, the set of hyperparameters used by the model 314, as described herein. Thus, the model 314 may provide the same functionality as multiple different models that are separately configured to handle different driving contexts. Accordingly, the system 310 facilitates scalability of the model 114 to different driving contexts, and conserves computing resources that would otherwise be expended on storing, switching between, and updating multiple different models.

As indicated above, FIGS. 3A-3B are provided as an example. Other examples may differ from what is described with respect to FIGS. 3A-3B.

FIG. 4 is a diagram illustrating an example process 400 performed, for example, by a device, in accordance with the present disclosure. Example process 400 is an example where the device (e.g., system 310, UE 120, or the like) performs operations associated with model hyperparameter adjustment using vehicle driving context classification.

As shown in FIG. 4, in some aspects, process 400 may include obtaining information relating to an environment in which a vehicle is located (block 410). For example, the device (e.g., using communication manager 508 and/or sensing component 510, depicted in FIG. 5) may obtain information relating to an environment in which the vehicle is located, as described above.

As further shown in FIG. 4, in some aspects, process 400 may include determining using a machine learning model: a driving context of the vehicle based at least in part on the information relating to the environment, and a set of hyperparameters for a model, that is used to determine a driving behavior for the vehicle, based at least in part on the driving context (block 420). For example, the device (e.g., using communication manager 508 and/or determination component 512, depicted in FIG. 5) may determine using a machine learning model: a driving context of the vehicle based at least in part on the information relating to the environment, and a set of hyperparameters for a model, that is used to determine a driving behavior for the vehicle, based at least in part on the driving context, as described above.

As further shown in FIG. 4, in some aspects, process 400 may include determining, using the model configured with the set of hyperparameters, the driving behavior for the vehicle (block 430). For example, the device (e.g., using communication manager 508 and/or determination component 512, depicted in FIG. 5) may determine, using the model configured with the set of hyperparameters, the driving behavior for the vehicle, as described above.

As further shown in FIG. 4, in some aspects, process 400 may include causing autonomous operation of the vehicle in accordance with the driving behavior (block 440). For example, the device (e.g., using communication manager 508 and/or acting component 514, depicted in FIG. 5) may cause autonomous operation of the vehicle in accordance with the driving behavior, as described above.

Process 400 may include additional aspects, such as any single aspect or any combination of aspects described below and/or in connection with one or more other processes described elsewhere herein.

In a first aspect, the model is based at least in part on a heuristic search algorithm.

In a second aspect, alone or in combination with the first aspect, the model is based at least in part on a Monte Carlo tree search.

In a third aspect, alone or in combination with one or more of the first and second aspects, the set of hyperparameters includes at least one of a tree width, a tree depth, a time length for a step in a tree, or a reward function.

In a fourth aspect, alone or in combination with one or more of the first through third aspects, the machine learning model is a neural network trained to determine hyperparameters for the model based at least in part on driving context.

In a fifth aspect, alone or in combination with one or more of the first through fourth aspects, the driving context of the vehicle is an intersection context, a highway context, a local road context, or a parking lot context.

In a sixth aspect, alone or in combination with one or more of the first through fifth aspects, the information relating to the environment is obtained from one or more sensors of the vehicle.

In a seventh aspect, alone or in combination with one or more of the first through sixth aspects, the one or more sensors include one or more of a light detection and ranging system or a camera.

In an eighth aspect, alone or in combination with one or more of the first through seventh aspects, the driving behavior is determined to maximize a reward function for the model.

In a ninth aspect, alone or in combination with one or more of the first through eighth aspects, process 400 includes determining one or more intention predictions relating to one or more objects in the environment, where at least one of the driving context or the set of hyperparameters is determined further based at least in part on the one or more intention predictions.

In a tenth aspect, alone or in combination with one or more of the first through ninth aspects, process 400 includes configuring the model with the set of hyperparameters based at least in part on determining the set of hyperparameters.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
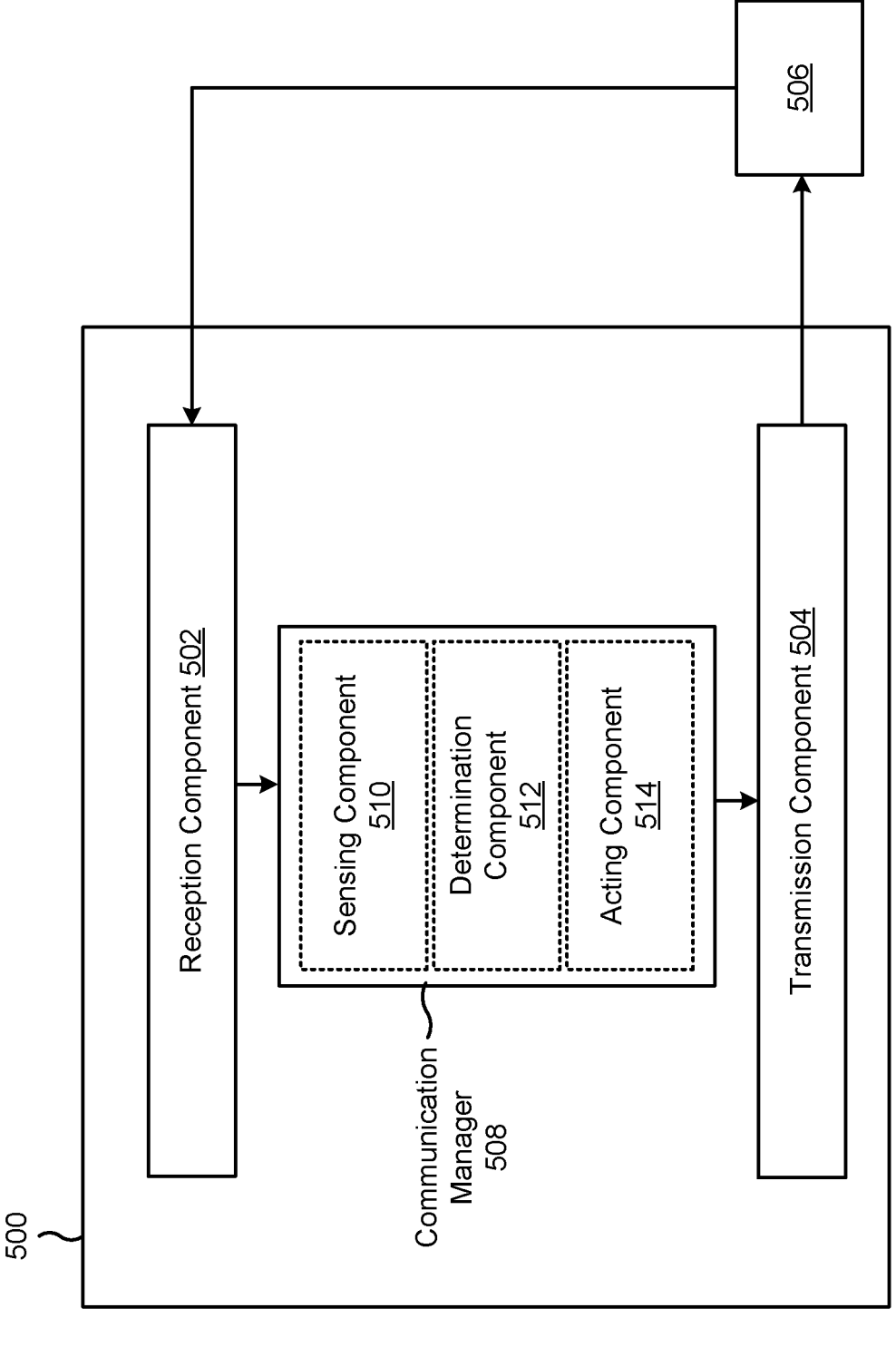
FIG. 5 is a diagram of an example apparatus, in accordance with the present disclosure.

FIG. 5 is a diagram of an example apparatus 500. The apparatus 500 may be a system for autonomous driving, or a system for autonomous driving may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 508. The communication manager 508 may be, may include, or may be similar to the communication manager 140. The communication manager 508 may include one or more of a sensing component 510, a determination component 512, or an acting component 514, among other examples.

In some aspects, the apparatus 500 may be configured to perform one or more operations described herein in connection with FIGS. 3A-3B. Additionally, or alternatively, the apparatus 500 may be configured to perform one or more processes described herein, such as process 400 of FIG. 4, or a combination thereof. In some aspects, the apparatus 500 and/or one or more components shown in FIG. 5 may include one or more components of the system described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a modem, a demodulator, a MIMO detector, a receive processor, a controller/processor, a memory, or a combination thereof, of the system described in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the system described in connection with FIG. 2. In some aspects, the transmission component 504 may be co-located with the reception component 502 in a transceiver.

The sensing component 510 may obtain information relating to an environment in which a vehicle is located. The determination component 512 may determine, using a machine learning model, a driving context of the vehicle based at least in part on the information relating to the environment, and a set of hyperparameters for a model, that is used to determine a driving behavior for the vehicle, based at least in part on the driving context. The determination component 512 may determine, using the model configured with the set of hyperparameters, the driving behavior for the vehicle. The acting component 514 may cause autonomous operation of the vehicle in accordance with the driving behavior.

The determination component 512 may determine one or more intention predictions relating to one or more objects in the environment. In some aspects, at least one of the driving context or the set of hyperparameters is determined further based at least in part on the one or more intention predictions. The determination component 512 may configure the model with the set of hyperparameters based at least in part on determining the set of hyperparameters.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method, comprising: obtaining, by a device of a vehicle, information relating to an environment in which the vehicle is located; determining by the device using a machine learning model: a driving context of the vehicle based at least in part on the information relating to the environment, and a set of hyperparameters for a model, that is used to determine a driving behavior for the vehicle, based at least in part on the driving context; determining, by the device and using the model configured with the set of hyperparameters, the driving behavior for the vehicle; and causing, by the device, autonomous operation of the vehicle in accordance with the driving behavior.

Aspect 2: The method of Aspect 1, wherein the model is based at least in part on a heuristic search algorithm.

Aspect 3: The method of any of Aspects 1-2, wherein the model is based at least in part on a Monte Carlo tree search.

Aspect 4: The method of any of Aspects 1-3, wherein the set of hyperparameters includes at least one of: a tree width, a tree depth, a time length for a step in a tree, or a reward function.

Aspect 5: The method of any of Aspects 1-4, wherein the machine learning model is a neural network trained to determine hyperparameters for the model based at least in part on driving context.

Aspect 6: The method of any of Aspects 1-5, wherein the driving context of the vehicle is an intersection context, a highway context, a local road context, or a parking lot context.

Aspect 7: The method of any of Aspects 1-6, wherein the information relating to the environment is obtained from one or more sensors of the vehicle.

Aspect 8: The method of Aspect 7, wherein the one or more sensors include one or more of: a light detection and ranging system or a camera.

Aspect 9: The method of any of Aspects 1-8, wherein the driving behavior is determined to maximize a reward function for the model.

Aspect 10: The method of any of Aspects 1-9, further comprising: determining one or more intention predictions relating to one or more objects in the environment, wherein at least one of the driving context or the set of hyperparameters is determined further based at least in part on the one or more intention predictions.

Aspect 11: The method of any of Aspects 1-10, further comprising: configuring the model with the set of hyperparameters based at least in part on determining the set of hyperparameters.

Aspect 12: An apparatus at a device, comprising a processor; memory coupled with the processor; and instructions stored in the memory and executable by the processor to cause the apparatus to perform the method of one or more of Aspects 1-11.

Aspect 13: A device, comprising a memory and one or more processors coupled to the memory, the one or more processors configured to perform the method of one or more of Aspects 1-11.

Aspect 14: An apparatus, comprising at least one means for performing the method of one or more of Aspects 1-11.

Aspect 15: A non-transitory computer-readable medium storing code, the code comprising instructions executable by a processor to perform the method of one or more of Aspects 1-11.

Aspect 16: A non-transitory computer-readable medium storing a set of instructions, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device of a vehicle, information relating to an environment in which the vehicle is located;
   determining, by the device, using a machine learning model:
      a current driving context of the vehicle based at least in part on the information relating to the environment, and a plurality of hyperparameters, comprising a tree width, a tree depth, a time length for a step in a tree, and a reward function, wherein each hyperparameter, of the plurality of hyperparameters, is determined based at least in part on the current driving context, for a model, wherein the model is used to determine an autonomous driving behavior for the vehicle;

configuring the model with the plurality of hyperparameters based at least in part on determining the plurality of hyperparameters;

determining, by the device and using the model configured with the plurality of hyperparameters, the autonomous driving behavior, wherein the autonomous driving behavior is determined based at least in part on the reward function for the model; and causing, by the device, autonomous operation of the vehicle in accordance with the autonomous driving behavior.

2. The method of claim 1,
wherein the model is based at least in part on a heuristic search algorithm.

3. The method of claim 1,
wherein the model is based at least in part on a Monte Carlo tree search.

4. The method of claim 1,
wherein the machine learning model is a neural network trained to determine the plurality of hyperparameters for the model based at least in part on the current driving context.

5. The method of claim 1,
wherein the current driving context of the vehicle is an intersection context, a highway context, a local road context, or a parking lot context.

6. The method of claim 1,
wherein the information relating to the environment is obtained from one or more sensors of the vehicle.

7. The method of claim 6,
wherein the one or more sensors include one or more of: a light detection and ranging system or a camera.

8. The method of claim 1,
wherein the autonomous driving behavior is determined to maximize the reward function for the model.

9. The method of claim 1, further comprising:
determining one or more intention predictions relating to one or more objects in the environment,
wherein at least one of the current driving context or the plurality of hyperparameters is determined further based at least in part on the one or more intention predictions.

10. The method of claim 1, further comprising:
receiving, from another vehicle, an indication of the plurality of hyperparameters, wherein the determining the plurality of hyperparameters based at least in part on the indication.

11. The method of claim 10, wherein the indication further comprises a feedback value, wherein the feedback value indicates an accuracy associated with the autonomous driving behavior.

12. The method of claim 11, wherein the feedback value comprises a loss function value or value for the reward function.

13. The method of claim 11, wherein configuring the model further comprises:
configuring the model with the feedback value.

14. A system for autonomous driving of a vehicle, comprising:
one or more memories; and
one or more processors, coupled to the one or more memories, configured to:
obtain information relating to an environment in which the vehicle is located;
determine, using a machine learning model:
a current driving context of the vehicle based at least in part on the information relating to the environment, and
a plurality of hyperparameters, comprising a tree width, a tree depth, a time length for a step in a tree, and a reward function, wherein each hyperparameter, of the plurality of hyperparameters, is determined based at least in part on the current driving context, for a model, wherein the model is used to determine an autonomous driving behavior for the vehicle;
configure the model with the plurality of hyperparameters based at least in part on determining the plurality of hyperparameters;
determine, using the model configured with the plurality of hyperparameters, the autonomous driving behavior, wherein the autonomous driving behavior is determined based at least in part on the reward function for the model; and
cause autonomous operation of the vehicle in accordance with the autonomous driving behavior.

15. The system of claim 14,
wherein the model is based at least in part on a heuristic search algorithm.

16. The system of claim 14,
wherein the model is based at least in part on a Monte Carlo tree search.

17. The system of claim 14,
wherein the machine learning model is a neural network trained to determine the plurality of hyperparameters for the model based at least in part on the current driving context.

18. The system of claim 14,
wherein the current driving context of the vehicle is an intersection context, a highway context, a local road context, or a parking lot context.

19. The system of claim 14,
wherein the information relating to the environment is obtained from one or more sensors of the vehicle.

20. The system of claim 19,
wherein the one or more sensors include one or more of: a light detection and ranging system or a camera.

21. The system of claim 14,
wherein the autonomous driving behavior is determined to maximize the reward function for the model.

22. The system of claim 14,
wherein the one or more processors are further configured to:
determine one or more intention predictions relating to one or more objects in the environment,
wherein at least one of the current driving context or the plurality of hyperparameters is determined further based at least in part on the one or more intention predictions.

23. A non-transitory computer-readable medium storing a set of instructions, the set of instructions comprising:

one or more instructions that, when executed by one or more processors of a device, cause the device to:

obtain information relating to an environment in which a vehicle is located;

determine, using a machine learning model:

a current driving context of the vehicle based at least in part on the information relating to the environment, and a plurality of hyperparameters, comprising a tree width, a tree depth, a time length for a step in a tree, and a reward function, wherein each hyperparameter, of the plurality of hyperparameters, is determined based at least in part on the current driving context, for a model, wherein the model is used to determine an autonomous driving behavior for the vehicle;

configure the model with the plurality of hyperparameters based at least in part on determining the plurality of hyperparameters;

determine, using the model configured with the plurality of hyperparameters, the autonomous driving behavior, wherein the autonomous driving behavior is determined based at least in part on the reward function for the model; and cause autonomous operation of the vehicle in accordance with the autonomous driving behavior.

24. The non-transitory computer-readable medium of claim 23, wherein the current driving context of the vehicle is an intersection context, a highway context, a local road context, or a parking lot context.

25. The non-transitory computer-readable medium of claim 23, wherein the one or more instructions further cause the device to:

determine one or more intention predictions relating to one or more objects in the environment, wherein at least one of the current driving context or the plurality of hyperparameters is determined further based at least in part on the one or more intention predictions.

26. An apparatus, comprising:

means for obtaining information relating to an environment in which a vehicle is located;

means for determining, using a machine learning model, a current driving context of the vehicle based at least in part on the information relating to the environment, and a plurality of hyperparameters, comprising a tree width, a tree depth, a time length for a step in a tree, and a reward function, wherein each hyperparameter, of the plurality of hyperparameters, is determined based at least in part on the current driving context, for a model, wherein the model is used to determine an autonomous driving behavior for the vehicle;

means for configuring the model with the plurality of hyperparameters based at least in part on determining the plurality of hyperparameters;

means for determining, by the apparatus and using the model configured with the plurality of hyperparameters, the autonomous driving behavior, wherein the autonomous driving behavior is determined based at least in part on the reward function for the model; and means for causing, by the apparatus, autonomous operation of the vehicle in accordance with the autonomous driving behavior.

27. The apparatus of claim 26, further comprising:

means for determining one or more intention predictions relating to one or more objects in the environment, wherein the plurality of hyperparameters is determined further based at least in part on the one or more intention predictions.

28. The apparatus of claim 26, wherein the information relating to the environment is obtained from one or more sensors of the vehicle.

29. The apparatus of claim 28, wherein the one or more sensors include one or more of: a light detection and ranging system or a camera.

30. The apparatus of claim 26, wherein the autonomous driving behavior is determined to maximize the reward function for the model.

* * * * *